United States Patent
Dong et al.

(10) Patent No.: US 11,887,292 B1
(45) Date of Patent: Jan. 30, 2024

(54) TWO-STEP ANTI-FRAUD VEHICLE INSURANCE IMAGE COLLECTING AND QUALITY TESTING METHOD, SYSTEM AND DEVICE

(71) Applicant: ZHEJIANG LAB, Hangzhou (CN)

(72) Inventors: Jinni Dong, Hangzhou (CN); Jiaxi Yang, Hangzhou (CN); Kai Ding, Hangzhou (CN); Chongning Na, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/197,069

(22) Filed: May 13, 2023

(30) Foreign Application Priority Data

Nov. 1, 2022 (CN) .......................... 202211352917.9

(51) Int. Cl.
*G06K 9/00* (2022.01)
*G06T 7/00* (2017.01)
(Continued)

(52) U.S. Cl.
CPC ........... *G06T 7/0002* (2013.01); *G06Q 40/08* (2013.01); *G06T 7/70* (2017.01); *G06V 20/60* (2022.01);
(Continued)

(58) Field of Classification Search
CPC ................. G06T 7/0002; G06T 7/70; G06T 2207/30168; G06V 20/60; G06V 2201/08; G06Q 40/08
(Continued)

(56) References Cited

U.S. PATENT DOCUMENTS

2004/0083452 A1    4/2004   Minor et al.

FOREIGN PATENT DOCUMENTS

CN          115115611          9/2022

OTHER PUBLICATIONS

Fernando, Nisaja, et al. "Automated vehicle insurance claims processing using computer vision, natural language processing." 2022 22nd International Conference on Advances in ICT for Emerging Regions (ICTer). IEEE, 2022. (Year: 2022).*

(Continued)

*Primary Examiner* — Jonathan S Lee
(74) *Attorney, Agent, or Firm* — Jiwen Chen; Joywin IP Law PLLC

(57) ABSTRACT

The present invention discloses a two-step anti-fraud vehicle insurance image collecting and quality testing method, system and device, the method comprises: step 1, collecting vehicle insurance scene images and marking vehicle orientation; step 2, performing object detection on the collected vehicle insurance scene images and screening to obtain object coordinates; step 3, according to the vehicle orientation and the object coordinates, obtaining the specific position of the object coordinates located in the whole vehicle; step 4, according to the object coordinates screened in step 2, performing vehicle component detection on the vehicle insurance scene images, obtaining the component coordinates of the vehicle components, and screening to obtain the vehicle component closest to the object coordinates; step 5, according to the specific position of the object coordinates located in the whole vehicle and the vehicle components closest to the object coordinates, obtaining the position of the vehicle components closest to the object coordinates that are located in the whole vehicle, and abstracting them into the tabular data. The present invention avoids the existence (Continued)

of low-quality images in the traditional insurance industry and the large amount of time spent on manual identification.

5 Claims, 4 Drawing Sheets

(51) Int. Cl.
    *G06T 7/70* (2017.01)
    *G06Q 40/08* (2012.01)
    *G06V 20/60* (2022.01)

(52) U.S. Cl.
    CPC ............... *G06T 2207/30168* (2013.01); *G06V 2201/08* (2022.01)

(58) Field of Classification Search
    USPC ......................................................... 382/103
    See application file for complete search history.

(56) References Cited

OTHER PUBLICATIONS

Jayawardena, Srimal. "Image based automatic vehicle damage detection." (2013). (Year: 2013).*

Li, Lin, Koshin Ono, and Chun-Kit Ngan. "A deep learning and transfer learning approach for vehicle damage detection." The International FLAIRS Conference Proceedings. vol. 34. 2021. (Year: 2021).*

Dwivedi, Mahavir, et al. "Deep learning-based car damage classification and detection." Advances in Artificial Intelligence and Data Engineering: Select Proceedings of AIDE 2019. Springer Singapore, 2021. (Year: 2021).*

Park, Kyung Ho, et al. "Visual representation learning for automating car part recognition in a large-scale car sharing platform." 2021 IEEE 17th International Conference on Automation Science and Engineering (CASE). IEEE, 2021. (Year: 2021).*

Poon, Fred, et al. "Modeling and Application of Neural Networks for Automotive Damage Appraisals." SMU Data Science Review 5.1 (2021): 3. (Year: 2021).*

Kumar, S. Suresh, and K. Devaki. "Assessing car damage using mask R-CNN." arXiv preprint arXiv:2004.14173 (2020). (Year: 2020).*

Singh, Ranjodh, et al. "Automating car insurance claims using deep learning techniques." 2019 IEEE Fifth International Conference on Multimedia Big Data (BigMM). IEEE, 2019. (Year: 2019).*

Waqas, Umer, et al. "Vehicle damage classification and fraudulent image detection including moiré effect using deep learning." 2020 IEEE Canadian Conference on Electrical and Computer Engineering (CCECE). IEEE, 2020. (Year: 2020).*

* cited by examiner

Frist step :
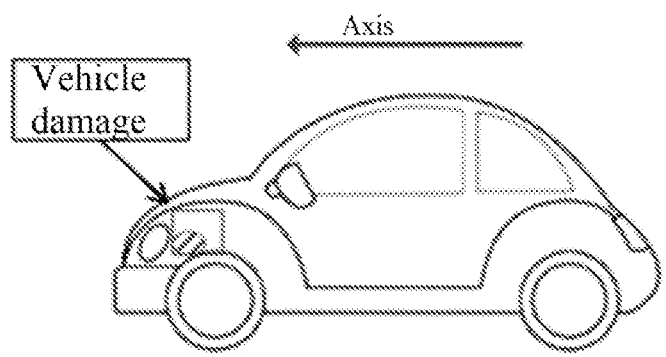
Second step :
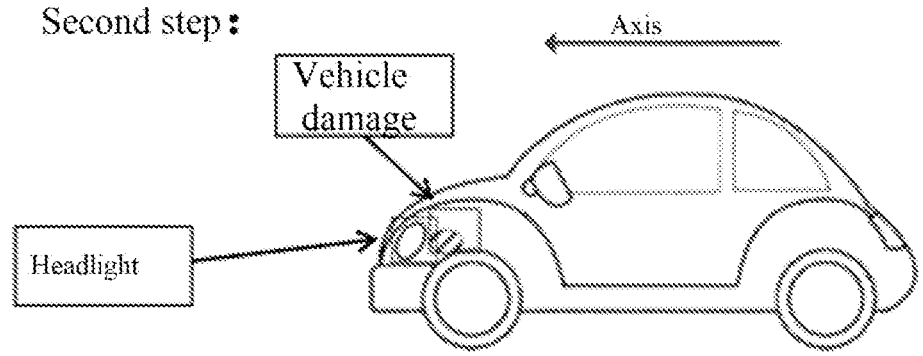
Figure 1

Step 1, collecting vehicle insurance scene images, and marking a pointing arrow through the vehicle insurance claim process terminal, the pointing arrow is the vehicle orientation Step 2, performing object detection on the collected vehicle insurance scene images, obtaining a confidence score of vehicle damage objects, and screening to obtain object coordinates Step 3, according to the vehicle orientation marked in Step 1 and the object coordinates in Step 2, obtaining the specific position of the object coordinates located in the whole vehicle Step 4, according to the object coordinates screened in step 2, performing vehicle component detection on the vehicle insurance scene images, obtaining the confidence score and component coordinates of the vehicle components, and screening to obtain the vehicle component closest to the object coordinates Step 5, according to the specific position of the object coordinates located in the whole vehicle obtained in step 3 and the vehicle components closest to the object coordinates obtained in step 4, obtaining the position of the vehicle components closest to the object coordinates that are located in the whole vehicle, and abstracting them into the tabular data

Figure 2

TWO-STEP ANTI-FRAUD VEHICLE INSURANCE IMAGE COLLECTING AND QUALITY TESTING METHOD, SYSTEM AND DEVICE

This application claims priority of Chinese Application No. 202211352917.9, filed Nov. 1, 2022, which is hereby incorporated by reference.

FIELD OF TECHNOLOGY

The present invention relates to the field of insurance anti-fraud, in particular to a two-step anti-fraud vehicle insurance image collecting and quality testing method, system and device.

BACKGROUND TECHNOLOGY

With the increasing proportion and amount of insurance fraud in recent years, and the trend of gang fraud, using computer recognition technology to improve detection efficiency and accuracy in the field of insurance anti-fraud has become an inevitable trend.

The existing application of computer recognition technology in the vehicle insurance industry is more applied to tabular data of insurance. Multimedia data such as pictures and voice are lack of processing and mostly rely on manual processing. And the processing of image data heavily relies on the quality of image collection by inspector. It is easy to cause the collected images to lack key information for assessing damage or determining fraudulent behavior, which can have an impact on subsequent case judgments.

Therefore, it is necessary to standardize the process of image collection, ensure the acquisition of key information, and develop a set of image recognition algorithms to extract key information from images to reduce manual processing workload.

SUMMARY OF THE INVENTION

In order to solve the aforementioned technical problems in the existing technology, the present invention proposes a two-step anti-fraud vehicle insurance image collecting and quality testing method, device, and system. The specific technical solution is as follows:

A two-step anti-fraud vehicle insurance image collecting and quality testing method, wherein, first, judging the position of the vehicle damage object on the vehicle in the first step, and then determining the vehicle components closest to the vehicle damage object in the second step and abstracting them into tabular data, specifically including the following steps:

Step 1, collecting vehicle insurance scene images, and marking a pointing arrow through the vehicle insurance claim process terminal, the pointing arrow is the vehicle orientation;

Step 2, performing object detection on the collected vehicle insurance scene images, obtaining a confidence score of vehicle damage objects, and screening to obtain object coordinates;

Step 3, according to the vehicle orientation marked in Step 1 and the object coordinates in Step 2, obtaining the specific position of the object coordinates located in the whole vehicle;

Step 4, according to the object coordinates screened in step 2, performing vehicle component detection on the vehicle insurance scene images, obtaining the confidence score and component coordinates of the vehicle components, and screening to obtain the vehicle component closest to the object coordinates;

Step 5, according to the specific position of the object coordinates located in the whole vehicle obtained in step 3 and the vehicle components closest to the object coordinates obtained in step 4, obtaining the position of the vehicle components closest to the object coordinates that are located in the whole vehicle, and abstracting them into the tabular data.

Preferably, the vehicle insurance scene images comprise vehicle scene images and vehicle damage detail images, the vehicle scene images comprise images taken from six angles: left front, right front, left side, right side, left rear, and right rear. The images show that the whole vehicle is exposed, and the proportion of vehicle is not less than 80% of the entire image; the vehicle damage detail images show the detailed position of the vehicle damage; the pointing arrow points from the rear to the front of the vehicle, indicating the orientation of the vehicle in the vehicle scene images.

Preferably, the object detection in step 2 specifically involves using the Yolov5 algorithm to identify the vehicle scene images and vehicle damage detail images, and obtain the object coordinates of the vehicle damage.

Preferably, the calculation method for the specific position of the object coordinates located in the whole vehicle in step 3 includes the following steps:

1) calculating the distance between the object coordinate and the center point of each part of the vehicle using the following formula:

$$l_i(s) = \|s - S_i\|_2$$

Where, $\|\cdot\|_2$ is a 2-norm, and i can be taken as 0, 1, and 2, representing the specific positions of the vehicle, including the front, middle, and rear. s represents the object coordinate. When i is taken as 0, 1, and 2, $s_i$ represents the coordinates of the center points of the front, middle, and rear of the vehicle, the calculation method for $s_i$ is as follows:

$$s_i = \begin{cases} \dfrac{5s_h + s_t}{6}, & i = 0 \\ \dfrac{s_h + s_t}{2}, & i = 1 \\ \dfrac{s_h + 5s_t}{6}, & i = 2 \end{cases}$$

among them, $s_h$ is the coordinate of the front of the vehicle, $s_t$ is the rear of the vehicle.

2) based on the distance between the object coordinate and the center point of each part of the vehicle, obtain the position indication I of the object coordinate, the formula is as follows:

$$I = f(s) = \begin{cases} 0, & \text{if } l_0(s) = l_m(s) \\ 2, & \text{if } l_2(s) = l_m(s) \\ 1, & \text{else} \end{cases}$$

among them, I represents that the position indication of the object coordinate, 0 represents that the object coordinate is located in the front of the vehicle, 1 represents that the object coordinate is located in the middle of the vehicle, and 2 represents that the object coordinate is located in the rear of the vehicle; $l_m$ is the minimum distance between the object coordinate and the center point of each part of the vehicle, and the calculation formula is as follows:

$$l_m(s)=\min(l_0(s),l_1(S),l_2(s)).$$

Preferably, the step 4 is as follows: the object detection is carried out on the vehicle insurance scene images, and all component coordinates are obtained, the object coordinates screened through step 2 are used to calculate the distance between the object coordinates and all component coordinates, the component with the smallest distance is selected as the vehicle component closest to the object coordinates.

A two-step anti-fraud vehicle insurance image collecting and quality testing system, comprising:
- a vehicle insurance claim processing terminal, a vehicle insurance claim processing cloud database, an image recognition and classification module;
- based on an artificial intelligence model, the vehicle insurance claim processing terminal is used to collect vehicle insurance scene evidence, and vehicle insurance data information, including: vehicle scene images and vehicle damage detail images;
- the vehicle insurance claim processing cloud database is used to store and retrieve historical image data collected during the vehicle insurance claim process;
- the image recognition and classification module extracts the vehicle damage information based on the computer vision algorithm, obtains the vehicle damage object and its relative position, and converts them into tabular data information.

A two-step anti-fraud vehicle insurance image collecting and quality testing device, comprising one or more processors for implementing the two-step anti-fraud vehicle insurance image collecting and quality testing method.

A computer-readable storage medium, storing a program, when the program is executed by a processor, the two-step anti-fraud vehicle insurance image collecting and quality testing method according to any one of claims 1 to 5 is implemented.

Compared with the prior art, the beneficial effects of the present invention are as follows: in the two-step anti-fraud vehicle insurance image collecting and quality testing method proposed by the present invention, in the first step, the object detection method is used to identify vehicle damage and vehicle component coordinates, providing more accurate prediction results for the second step of tabular data extraction; in the second step of tabular data extraction, a standardized image acquisition of a vehicle insurance claim processing terminal is used to obtain clear images containing the direction of the vehicle. According to the detection results in the first step, the relative position of the vehicle damage is judged, which avoids the existence of low-quality images in the traditional insurance industry and the large amount of time spent on manual identification.

BRIEF DESCRIPTION OF THE DRAWINGS

FIG. 1 shows the process diagram of a two-step anti-fraud vehicle insurance image collecting and quality testing of the present invention;

FIG. 2 is a flowchart of two-step anti-fraud vehicle insurance image collecting and quality testing method provided by the present invention;

DETAILED DESCRIPTION OF THE EMBODIMENTS

In order to make the purpose, technical solution, and technical effects of the present invention clearer and clearer, the following is a further detailed explanation of the present invention in conjunction with the accompanying drawings and embodiments of the specification.

The present invention provides a two-step anti-fraud vehicle insurance image collecting and quality testing system, comprising: a vehicle insurance claim processing terminal, a vehicle insurance claim processing cloud database, an image recognition and classification module; based on an artificial intelligence model, the vehicle insurance claim processing terminal is used to collect vehicle insurance scene evidence, and vehicle insurance data information, including: vehicle scene images and vehicle damage detail images; the vehicle insurance claim processing cloud database is used to store and retrieve historical image data collected during the vehicle insurance claim process; the image recognition and classification module extracts the vehicle damage information based on the computer vision algorithm, obtains the vehicle damage object and its relative position, and converts them into tabular data information.

Figure 3:
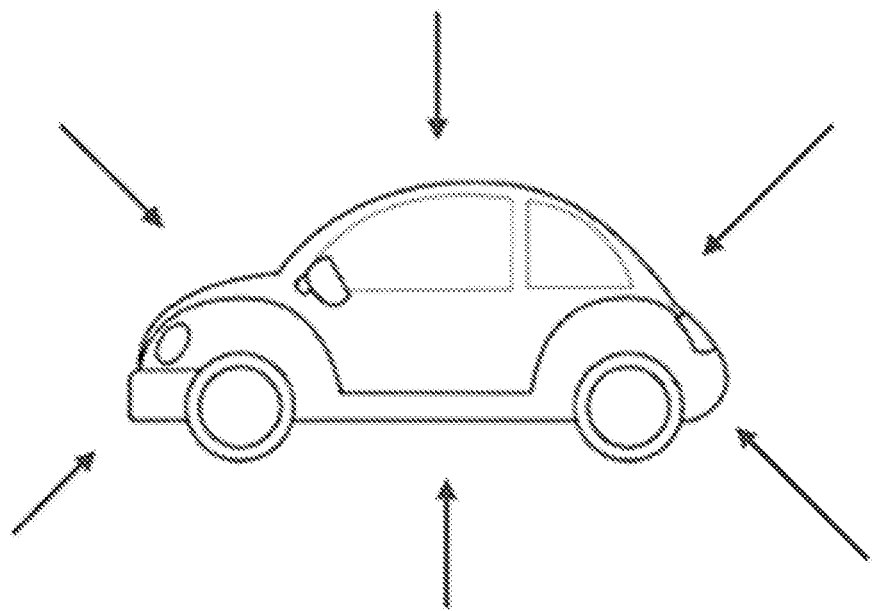
FIG. 3 is a photo schematic diagram of the vehicle insurance claim processing terminal provided by the present invention.

Step 1, As shown in FIG. 1, the present invention provides a two-step anti-fraud vehicle insurance image collecting and quality testing method, first, judging the position of the vehicle damage object on the vehicle in the first step, and then determining the vehicle components closest to the vehicle damage object in the second step and abstracting them into tabular data, that is, determining the relative position of vehicle damage; Specifically, as shown in FIG. 2, specifically including the following steps:

the vehicle insurance scene images comprise vehicle scene images and vehicle damage detail images, with the following framing rules: the whole vehicle is exposed in the vehicle scene images, and the proportion of vehicle is not less than 80% of the entire image, it is required to shoot the vehicle from six angles: left front, right front, left side, right side, left rear, and right rear, as shown in FIG. 3. The vehicle damage detail images need show the detailed position of the vehicle damage. Preferably, during the photography process, the vehicle insurance claim processing terminal will classify and upload the collected photos and remind the attention points for photography. For photos with lower quality and blurry images, it is required to retake them to ensure the quality of the photos.

Figure 4:
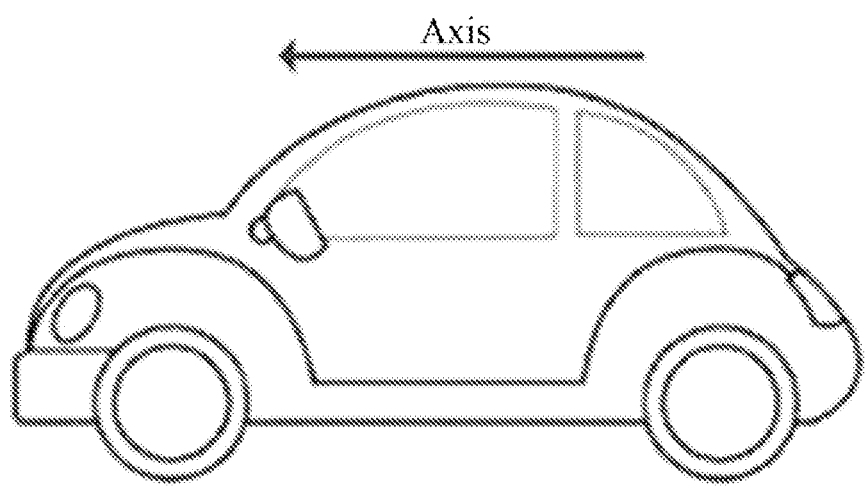
FIG. 4 is a schematic diagram of the annotation of the vehicle insurance claim processing terminal provided by the present invention.

The pointing arrow points from the rear to the front of the vehicle, indicating the orientation of the vehicle in the vehicle scene images, as shown in FIG. 4.

Step 2, performing object detection on the collected vehicle insurance scene images, obtaining a confidence score of vehicle damage objects, and screening to obtain object coordinates.

Wherein, the object detection in step 2 specifically involves using the Yolov5 algorithm to identify the vehicle scene images and vehicle damage detail images, and obtain the object coordinates of the vehicle damage.

Step 3, according to the vehicle orientation marked in Step 1 and the object coordinates in Step 2, obtaining the specific position of the object coordinates located in the whole vehicle. Specifically, the specific parts of the entire vehicle include the front, middle, and rear parts.

The specific position of the object coordinates located in the whole vehicle is obtained through the calculation method of the position of the object coordinates.

The calculation method for the specific position of the object coordinates located in the whole vehicle in step 3 includes the following steps:

1) calculating the distance between the object coordinate and the center point of each part of the vehicle using the following formula:

$$l_i(S) = \|S - S_i\|_2$$

Where, $\|\cdot\|_2$ is a 2-norm, and i can be taken as 0, 1, and 2, representing the specific positions of the vehicle, including the front, middle, and rear. s represents the object coordinate. When i is taken as 0, 1, and 2, $s_i$ represents the coordinates of the center points of the front, middle, and rear of the vehicle, the calculation method for $s_i$ is as follows:

$$s_i = \begin{cases} \frac{5s_h + s_t}{6}, & i = 0 \\ \frac{s_h + s_t}{2}, & i = 1 \\ \frac{s_h + 5s_t}{6}, & i = 2 \end{cases}$$

among them, $s_h$ is the coordinate of the front of the vehicle, $s_t$ is the rear of the vehicle.

2) based on the distance between the object coordinate and the center point of each part of the vehicle, obtain the position indication I of the object coordinate, the formula is as follows:

$$I = f(s) = \begin{cases} 0, & \text{if } l_0(s) = l_m(s) \\ 2, & \text{if } l_2(s) = l_m(s) \\ 1, & \text{else} \end{cases}$$

among them, I represents that the position indication of the object coordinate, 0 represents that the object coordinate is located in the front of the vehicle, 1 represents that the object coordinate is located in the middle of the vehicle, and 2 represents that the object coordinate is located in the rear of the vehicle; $l_m$ is the minimum distance between the object coordinate and the center point of each part of the vehicle, and the calculation formula is as follows:

$$l_m(s) = \min(l_0(S), l_1(S), l_2(S)).$$

Step 4, according to the object coordinates screened in step 2, performing vehicle component detection on the vehicle insurance scene images, obtaining the confidence score and component coordinates of the vehicle components, and screening to obtain the vehicle component closest to the object coordinates.

Specifically, the object detection is carried out on the vehicle insurance scene images, and all component coordinates are obtained, the object coordinates screened through step 2 are used to calculate the distance between the object coordinates and all component coordinates, the component with the smallest distance is selected as the vehicle component closest to the object coordinates.

The classification information of the vehicle components is shown in the table below:

| Automobile Parts |
| --- |
| Front light |
| Tail light |
| door |
| Front bumper |
| Tail bumper |
| Front wheel |
| Back wheel |
| Front windshield |
| Rear windshield |
| Front left door |
| Front right door |
| Back left door |
| Back right door |
| Engine cover |
| Trunk lid |

Step 5, according to the specific position of the object coordinates located in the whole vehicle obtained in step 3 and the vehicle components closest to the object coordinates obtained in step 4, obtaining the position of the vehicle components closest to the object coordinates that are located in the whole vehicle, and abstracting them into the tabular data.

In correspondence with the aforementioned embodiments of the two-step anti-fraud vehicle insurance image collecting and quality testing method, the present invention also provides embodiments of a two-step anti-fraud vehicle insurance image collecting and quality testing device.

Figure 5:
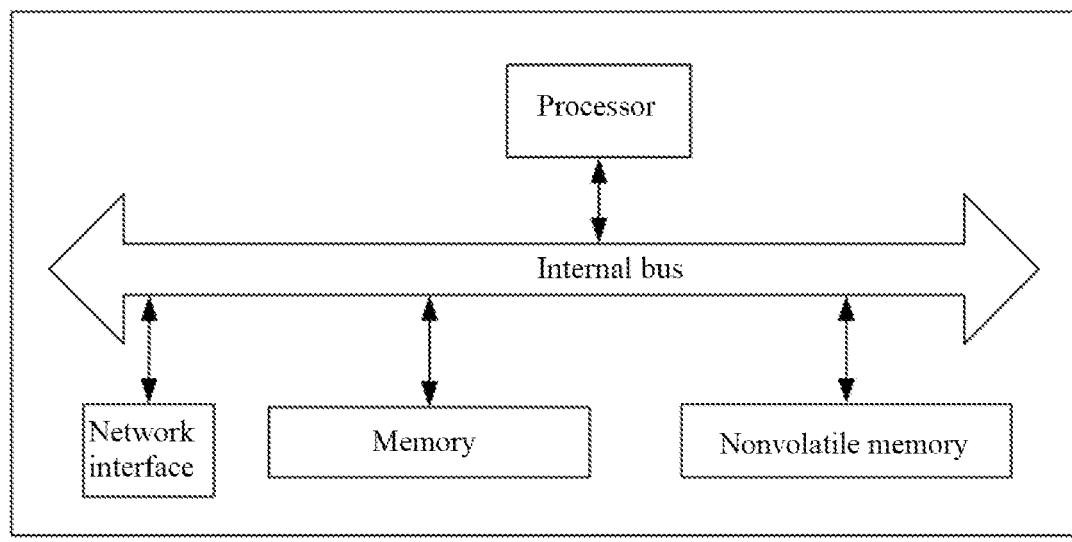
FIG. 5 is a structural schematic diagram of a two-step anti-fraud vehicle insurance image collecting and quality testing device according to the embodiment of the present invention.

Referring to FIG. 5, the embodiment of the present invention provides the two-step anti-fraud vehicle insurance image collecting and quality testing device, comprising one or more processors, for implementing the two-step anti-fraud vehicle insurance image collecting and quality testing method.

The embodiment of the two-step anti-fraud vehicle insurance image collecting and quality testing device of the present invention can be applied to any device with data processing capabilities, which can be equipment or a device such as a computer. An embodiment of device can be implemented by software, hardware or a combination of software and hardware. Taking software implementation as an example, as a logical device, it is formed by reading corresponding computer program instructions from non-volatile memory into memory and running them through the processor of any device with data processing capabilities in which it resides. From a hardware perspective, as shown in FIG. 5, it is a hardware structure diagram of any device with data processing capabilities where the two-step anti-fraud vehicle insurance image collecting and quality testing method of the present invention is located, in addition to the processor, memory, network interface, and nonvolatile memory shown in FIG. 5, any equipment where the device of the embodiment is located has data processing capabilities, it can also include other hardware based on the actual functions of the device with data processing capabilities, which will not be described again.

The implementation process of the functions of each unit in the above device is detailed in the implementation process of the corresponding steps in the above method, and will not be described again here.

For device embodiments, since they basically correspond to the method embodiments, please refer to the explanation in the relevant section of the method embodiments for relevant details. The device embodiments described above are only illustrative, in which the units described as separate components can be or may not be physically separated, and the components displayed as units can be or may not be physical units, that is, they can be located in one place, or they can be distributed across multiple network units. Some or all of the modules can be selected according to actual needs to achieve the purpose of the solution of the present invention. Those skilled in the art can understand and implement it without paying creative labor.

The embodiment of the present invention also provides a computer-readable storage medium on which a program is stored, when the program is executed by the processor, the two-step anti-fraud vehicle insurance image collecting and quality testing method in the above embodiment is implemented.

The computer-readable storage medium may be an internal storage unit, such as a hard disk or memory, of any device having data processing capabilities described in any of the preceding embodiments. The computer-readable storage medium can also be any device with data processing capabilities, such as a plug-in hard disk, Smart Media Card (SMC), SD card, Flash Card, and the like provided on the device. Further, the computer-readable storage medium may include both an internal storage unit of any device with data processing capabilities and an external storage device. The computer-readable storage medium is used to store the computer program and other programs and data required by any device with data processing capabilities, and can also be used to temporarily store data that has been or will be output.

The above is only a preferred embodiment of the present invention and does not impose any formal limitations on the present invention. Although the implementation process of the present invention has been described in detail in the previous text, for those familiar with the art, they can still modify the technical solutions recorded in the aforementioned examples or replace some of the technical features equally. Any modifications, equivalent substitutions, etc. made within the spirit and principles of the present invention shall be included within the scope of protection of the present invention.

The invention claimed is:

1. A two-step anti-fraud vehicle insurance image collecting and quality testing method, wherein, first, judging a position of the vehicle damage object on a vehicle in a first step, and then determining vehicle components closest to the vehicle damage object in a second step and abstracting them into tabular data, specifically comprising the following steps:

step 1, collecting vehicle insurance scene images, and marking a pointing arrow through a vehicle insurance claim process terminal, a pointing arrow is a vehicle orientation; wherein, the vehicle insurance scene images comprise vehicle scene images and vehicle damage detail images, the vehicle scene images comprise images taken from six angles: left front, right front, left side, right side, left rear, and right rear; the images show that the whole vehicle is exposed, and the proportion of vehicle is not less than 80% of the entire image; the vehicle damage detail images show the detailed position of the vehicle damage; the pointing arrow points from the rear to the front of the vehicle, indicating the orientation of the vehicle in the vehicle scene images;

step 2, performing object detection on the collected vehicle insurance scene images, obtaining a confidence score of vehicle damage objects, and screening to obtain object coordinates;

step 3, according to the vehicle orientation marked in the step 1 and the object coordinates in the step 2, obtaining the specific position of the object coordinates located in the whole vehicle; wherein, the calculation method for the specific position of the object coordinates located in the whole vehicle in step 3 includes the following steps:

1) calculating the distance between the object coordinate and the center point of each part of the vehicle using the following formula:

$$l_i(S) = \|S - s_i\|_2$$

wherein, $\|\cdot\|_2$ is a 2-norm, and i can be taken as 0, 1, and 2, representing the specific positions of the vehicle, including the front, middle, and rear, s represents the object coordinate; when i is taken as 0, 1, and 2, $s_i$ represents the coordinates of the center points of the front, middle, and rear of the vehicle, the calculation method for $s_i$ is as follows:

$$s_i = \begin{cases} \dfrac{5s_h + s_t}{6}, & i = 0 \\ \dfrac{s_h + s_t}{2}, & i = 1 \\ \dfrac{s_h + 5s_t}{6}, & i = 2 \end{cases}$$

among them, $s_h$ is the coordinate of the front of the vehicle, $s_t$ is the rear of the vehicle;

2) based on the distance between the object coordinate and the center point of each part of the vehicle, obtain the position indication I of the object coordinate, the formula is as follows:

$$I = f(s) = \begin{cases} 0, & \text{if } l_0(s) = l_m(s) \\ 2, & \text{if } l_2(s) = l_m(s) \\ 1, & \text{else} \end{cases}$$

among them, I represents that the position indication of the object coordinate, 0 represents that the object coordinate is located in the front of the vehicle, 1 represents that the object coordinate is located in the middle of the vehicle, and 2 represents that the object coordinate is located in the rear of the vehicle; $l_m$ is the minimum distance between the object coordinate and the center point of each part of the vehicle, and the calculation formula is as follows:

$$l_m(s) = \min(l_0(S), l_1(S), l_2(s))$$

step 4, according to the object coordinates screened in the step 2, performing vehicle component detection on the vehicle insurance scene images, obtaining the confidence score and component coordinates of the vehicle components, and screening to obtain the vehicle component closest to the object coordinates; wherein, the object detection is carried out on the vehicle insurance scene images, and all component coordinates are obtained, the object coordinates screened through the step 2 are used to calculate the distance between the object coordinates and all component coordinates, the component with the smallest distance is selected as the vehicle component closest to the object coordinates;

step 5, according to the specific position of the object coordinates located in the whole vehicle obtained in the step 3 and the vehicle components closest to the object coordinates obtained in the step 4, obtaining the position of the vehicle components closest to the object coordinates that are located in the whole vehicle, and abstracting them into the tabular data.

2. A two-step anti-fraud vehicle insurance image collecting and quality testing device, comprising one or more processors for implementing the two-step anti-fraud vehicle insurance image collecting and quality testing method according to claim 1.

3. A nontransitory computer-readable storage medium, storing a program, when the program is executed by a processor, the two-step anti-fraud vehicle insurance image collecting and quality testing method according to claim 1.

4. The two-step anti-fraud vehicle insurance image collecting and quality testing method according to claim 1, wherein, the object detection in the step 2 specifically involves using the Yolov5 algorithm to identify the vehicle scene images and vehicle damage detail images, and obtain the object coordinates of the vehicle damage.

5. A two-step anti-fraud vehicle insurance image collecting and quality testing system implementing the method of claim 1, comprising:

a vehicle insurance claim processing terminal, a vehicle insurance claim processing cloud database, an image recognition and classification module;

based on an artificial intelligence model, the vehicle insurance claim processing terminal is used to collect vehicle insurance scene evidence, and vehicle insurance data information, including: vehicle scene images and vehicle damage detail images;

the vehicle insurance claim processing cloud database is used to store and retrieve historical image data collected during the vehicle insurance claim process;

the image recognition and classification module extracts the vehicle damage information based on the computer vision algorithm, obtains the vehicle damage object and its relative position, and converts them into tabular data information.

* * * * *